United States Patent [19]

Briscoe et al.

[11] 4,080,350

[45] Mar. 21, 1978

[54] DAMP PROOF COMPOSITIONS

[75] Inventors: Murray George Briscoe, Eckington; Ronald Sidebottom, Cheltenham; John Edwin Latham Smith, Horsham; David Brian George, Hatfield; David Watkin Price, Cheltenham, all of England

[73] Assignee: Coal Industry (Patents) Limited, London, England

[21] Appl. No.: 737,685

[22] Filed: Nov. 1, 1976

[30] Foreign Application Priority Data

Dec. 5, 1975 United Kingdom ............... 49991/75

[51] Int. Cl.$^2$ .............................................. C08L 95/00
[52] U.S. Cl. .............................. 260/28.5 B; 260/42.47
[58] Field of Search ............................ 260/28.5 B, 890

[56] References Cited

U.S. PATENT DOCUMENTS

| 2,506,339 | 5/1950 | Buckley et al. | 260/28.5 B |
| 2,658,050 | 11/1953 | Signer et al. | 260/890 X |
| 2,658,051 | 11/1953 | Signer et al. | 260/890 X |
| 2,807,596 | 9/1957 | Flickinger | 260/28.5 B |
| 3,042,652 | 7/1962 | Pariser et al. | 260/42.32 X |
| 3,050,484 | 8/1962 | Wood | 260/28.5 B |
| 3,115,533 | 12/1963 | Wiseblood | 260/28.5 B X |
| 4,000,140 | 12/1976 | Tierney | 260/28.5 B X |

FOREIGN PATENT DOCUMENTS 692,144   5/1953   United Kingdom ............ 260/28.5 B

*Primary Examiner*—Lewis T. Jacobs
*Attorney, Agent, or Firm*—Stevens, Davis, Miller & Mosher

[57] ABSTRACT

The invention discloses a novel damp proof composition, suitable for making into sheets for roofing purposes, comprising (a) from 5 to 40% of a polychloroprene rubber, (b) pitch in an amount of up to 45%, and (c) at least 5% of a filler. The filler may be particulate or fibrous, and the composition may further include a supplementary polymer, for instance a nitrile rubber.

5 Claims, No Drawings

DAMP PROOF COMPOSITIONS

This invention concerns polymeric damp proof compositions, and especially concerns roofing sheets.

The present invention provides a damp proof composition comprising at least 5% of a polychloroprene rubber, pitch in an amount of up to 45% and at least 5% of a filler.

The amount of polychloroprene rubber in the compositions is preferably from 5 to 35%, although it may be present in an amount of up to 40%. The polychloroprene rubber, which is sold under various trade marks such as "Neoprene" and "Butaclor" e.g. "Butaclor MC30" and "Butaclor ME 20", should preferably have a medium Mooney viscosity (e.g. between 50 and 60) and a slow rate of crystallisation.

The pitch is preferably present in an amount of up to 35%, and is preferably a coal tar pitch with a softening point (determined using the Ring and Ball method) of between 100° C and 110° C.

The filler may be a particulate or fibrous filler and is preferably a combination thereof. Suitable particulate fillers include china clay, whiting, carbon black, talc, slate powders and shale, which may be present alone or in combination in a total of from 5 to 60%, and preferably carbon black is present in the composition, especially in an amount of up to 25%. Silica or silicates of calcium, magnesium or aluminium, may be used in place of carbon black, particularly if the black colouration given by carbon black is not desired and the composition contains no pitch.

A fibrous filler is preferably incorporated in the composition in an amount of up to 12% preferably up to 10%, and may be an organic fibre, e.g. cotton, wool, nylon, terylene, or a blend thereof, or an inorganic fibre, e.g. asbestos. A suitable source of fibrous filler is chopped waste thermoplastic conveyor belting, in particular P.V.C. belting.

The composition may also include a supplementary polymer, such as nitrile, halobutyl, ethylene/propylene, or styrene butadiene rubbers, ethylene vinyl acetate co-polymer, chlorinated polyethylene, polyvinyl chloride or blends thereof. The polyvinyl chloride may be a homopolymer or a random copolymer, e.g. with as ester such as vinyl acetate. It is preferred to include nitrile rubber in an amount of from 5 to 20% in addition to another polymer in an amount of up to 45%.

The composition may contain processing aids such as polymeric plasticisers, epoxidised soya bean oil, chlorinated paraffins, paraffinnic and naphthenic oils, bitumen or waxes, e.g. polyethylene wax. It is desirable to keep the amount of polymeric plasticiser present to a minimum, preferably less than 3%. The epoxidised soya bean oil is present in amount of up to 5%, preferably less than 3%.

The composition is thermoplastic and flexible, and may be manufactured in conventional manner, e.g. by processing the desired components in a Banbury mixer at a suitable temperature, conveniently from 60° to 200° C, until a homogeneous mixture is formed. The homogeneous mixture may then be extruded, e.g. at a stock temperature of from 95° to 180° C, through a roller die to form a sheet. Alternatively, the composition may be formed by calendering, extrusion through a slit die, or compression moulding.

The compositions according to the invention may be used to form water-proofing cloaks, flashings, laminated or reinforced sheets or shaped profiles, or artefacts, for example made by extrusion, injection moulding or lamination techniques, for the building and construction industry. Membranes in the form of sheets are particularly indicated for use as waterproof roofing sheet. Suitable sheet thicknesses are from 0.25 to 6.3 mm, and the sheets may be used in conventional manner. Skrinkage of sheets when bonded to roofs and each other using bitumen or pitch adhesives is small and may be reduced by suitable alignment of fibrous filler during manufacture.

The invention is illustrated by the following Examples showing compositions which may be used to form sheeting by processing in a Banbury mixer and extruding through a roller die. The formed sheets exhibit properties which show their suitability for roofing, especially as regards dimensional stability, resistance to passage of water and water vapour and resistance to weathering. These examples are illustrative only, and do not in any way limit the scope of the invention.

| Example 1 | Parts |
|---|---|
| Polychloroprene rubber | 20 |
| Nitrile rubber | 10 |
| Carbon black | 15 |
| Polyvinyl chloride | 7 |
| Cotton/terylene fibres (50:50) | 6 |
| Whiting | 10 |
| Coal pitch | 30 |
| Polyethylene wax | 2 |
| Example 2 | |
| Polychloroprene rubber | 15 |
| Carbon black | 10 |
| Chlorinated polyethylene | 15 |
| Cotton/nylon fibre mixture (50:50) | 5 |
| China clay | 25 |
| Coal pitch | 25 |
| Epoxidised soya bean oil | 5 |
| Example 3 | |
| Polychloroprene rubber | 12 |
| Nitrile rubber | 12 |
| Chlorosulphonated polyethylene | 5 |
| Polyvinyl chloride | 5 |
| Carbon black | 24 |
| Terylene fibre | 3 |
| Whiting | 27 |
| Coal Pitch | 10 |
| Chlorinated paraffin | 2 |
| Example 4 | |
| Polychloroprene rubber | 10 |
| Chlorinated polyethylene | 10 |
| "Polyblack" | 22 |
| Chopped PVC conveyer belting | 4 |
| China clay (or Whiting) | 15 |
| Coal tar pitch | 29 |
| Epoxidised soya bean oil | 2 |
| Stearic acid | 1 |

"Polyblack" is a mixture of equal parts of nitrile rubber and carbon black.

Throughout this Specification and the following claims all parts and percentages are by weight, and the percentages refer to the total composition.

We claim:

1. A damp proof composition in sheet form, consisting essentially of
   (a) from 5 to 40% of a polychloroprene rubber having a medium Mooney viscosity and a slow rate of crystalization,
   (b) from 10 to 45% of a coal tar pitch having a softening point of between 100° and 110° C,
   (c) from 5 to 12% of a fibrous filler,
   (d) from 5 to 60% of a particulate filler,
   (e) from 10 to 65% of one or more supplementary polymers selected from the group consisting of nitrile or halobutyl rubbers or styrene-butadiene copolymer rubbers, ethylene-vinyl acetate copolymer, chlorinated polyethylene, chlorosulphonated polyethylene or polyvinyl chloride homo- or co-polymers, and (f) processing aids in an amount of 1 to 5%.

2. A composition as claimed in claim 1, wherein the particulate filler comprises up to 25% by weight of the total composition of carbon black.

3. A composition as claimed in claim 1, wherein the supplementary polymer comprises from 5 to 20% of nitrile rubber and up to 45% of one or more other of said polymers, by weight of the total composition.

4. A composition as claimed in claim 3, wherein the supplementary polymer comprises from 5 to 20% of nitrile rubber and about 7 to about 10% of one or more other of said polymers, by weight of the total composition.

5. A composition as claimed in claim 1, wherein the pitch is present in an amount of 10 to 35% by weight of the total composition.

* * * * *